United States Patent
Suzuki

(10) Patent No.: US 7,315,494 B2
(45) Date of Patent: Jan. 1, 2008

(54) OPTICAL DISK DEVICE AND METHOD FOR CONTROLLING SLIDER

(75) Inventor: Yuichi Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 515 days.

(21) Appl. No.: 10/822,814

(22) Filed: Apr. 13, 2004

(65) Prior Publication Data

US 2004/0257929 A1    Dec. 23, 2004

(30) Foreign Application Priority Data

Apr. 18, 2003  (JP) ............................. 2003-113820

(51) Int. Cl.
G11B 7/00    (2006.01)

(52) U.S. Cl. .............................. 369/44.29; 369/44.35; 369/47.25

(58) Field of Classification Search ............. 369/44.11, 369/44.12, 44.14, 44.15, 44.23, 44.24
See application file for complete search history.

(56) References Cited

U.S. PATENT DOCUMENTS

| | | | | |
|---|---|---|---|---|
| 5,696,742 A | * | 12/1997 | Ogata et al. | 369/47.22 |
| 6,044,050 A | * | 3/2000 | Kuroiwa | 369/44.41 |
| 6,249,495 B1 | * | 6/2001 | Okada et al. | 369/44.28 |
| 6,744,702 B2 | * | 6/2004 | Yonezawa | 369/30.17 |
| 6,791,915 B1 | * | 9/2004 | Lee et al. | 369/44.32 |

* cited by examiner

*Primary Examiner*—Nabil Hindi
(74) *Attorney, Agent, or Firm*—Oblon, Spivak, McClelland, Maier & Neustadt, P.C.

(57) ABSTRACT

An optical disk device includes a head including an actuator that supports and moves an objective lens at least in a direction of focusing, and a slider for transporting the head in the direction of tracking. In response to a static acceleration acting on the objective lens in response to a change in the posture of the optical disk device, and a low-frequency component of a tracking servo signal for causing the objective lens to track, a slider controller drives the slider so that the objective lens is aligned with the center of an optical field of view of the head. In this arrangement, the slider is controlled with reference to the low-frequency component of the tracking servo signal corrected in accordance with the level of gravity acting on the objective lens. Slider control is thus achieved to prevent a displacement, between the objective lens and the center of the optical field of view, caused by a change in the posture of the optical disk device.

5 Claims, 4 Drawing Sheets

OUTPUT OF ACCELERATION SENSOR for controlling slider

BACKGROUND OF THE INVENTION

1. Field of the Invention

The present invention relates to an optical disk device for recording a signal to and reading a signal from an optical disk, and a slider control method.

2. Description of the Related Art

Some types of optical disk devices for recording a signal to and reading a signal from the optical disk perform slider follow-up control during a track servo operation so that an objective lens operates in the vicinity of the center of an optical field of view.

A slider is designed to control a pickup in position so that the objective lens driven in a tracking direction is aligned in position with the center of the optical field of view of the pickup.

In the slider follow-up control, a displacement between the objective lens and the center of the optical field of view is estimated from the level of a low-frequency component of a tracking servo signal for a tracking operation.

For example, if a zero level is obtained as the level of the low-frequency component of the tracking servo signal, the objective lens is approximately aligned with a mechanical center position. In a pickup, the center of the optical field of view is set up to be aligned with the vicinity of the mechanical center position of the objective lens.

If the slider control is performed to move the pickup so that the level of the low-frequency component of the track servo signal becomes a zero level, the center of the optical field of view is thus caused to follow the objective lens.

Such an optical disk device is implemented as a video camera. The optical disk device as the video camera is typically carried and used in a variety of angles by a user.

Depending on the direction of the optical disk device, the objective lens may shift down to the tracking direction with the gravity thereof.

As is known, the objective lens is relatively softly supported by an actuator with an arm thereof in the optical disk system. When the optical disk device is tilted, the objective lens is shifted from the mechanical center position in the direction of gravity pull.

If the objective lens is shifted by its own weight in response to a change in the posture of the optical disk device, the slider follow-up control cannot be properly performed.

Even if the low-frequency component of the tracking servo signal is close to the zero level, the objective lens is already shifted from the mechanical center position in the direction of gravity pull with its own weight. If slider control is performed with a track target set to a position where the low-frequency component of the tracking servo signal becomes a zero level, the objective lens is thus shifted from the center of the optical field of view.

If the objective lens is displaced in position from the center of the optical field of view in the slider follow-up control, good optical characteristics cannot be achieved. The optical disk device becomes unstable in the tracking servo operation, and may exhibit poor recording and replay performance.

U.S. Pat. No. 6,473,373 discloses a technique that corrects position displacement of an objective lens in the movable direction thereof.

SUMMARY OF THE INVENTION

Accordingly, it is an object of the present invention to provide an optical disk device that, in slider control thereof, prevents an objective lens from being displaced from the center of an optical field of view due to a change in the posture of the optical disk device.

An optical disk device of the present invention in a first aspect for recording a signal to and/or replaying a signal from an optical disk, includes a head, including an actuator that supports and moves an objective lens at least in a direction of tracking, for writing the signal onto the optical disk and/or reading the signal from the optical disk by directing a laser beam to the optical disk through the objective lens, a slider for transporting the head in the direction of tracking, an acceleration sensor for detecting and outputting a static acceleration acting on the objective lens in response to a change in the posture of the optical disk device, and a slider controller for driving the slider so that the objective lens is aligned with the center of an optical field of view of the head, based on the signal detected by the acceleration sensor and a low-frequency component of a tracking servo signal for causing the objective lens to track.

A slider control method of the present invention in a second aspect controls an optical disk device for recording a signal to and/or replaying a signal from an optical disk, the optical disk device including a head including an actuator that supports and moves an objective lens at least in a direction of tracking, for writing the signal onto the optical disk and/or reading the signal from the optical disk by directing a laser beam to the optical disk through the objective lens, and a slider for transporting the head in the direction of tracking. The slider control method includes the steps of detecting a static acceleration acting on the objective lens in response to a change in the posture of the optical disk device, and driving the slider so that the objective lens is aligned with the center of an optical field of view of the head, based on the detected signal and a low-frequency component of a tracking servo signal for causing the objective lens to track.

The level of the static acceleration (gravity) acting on the objective lens varying in the tracking direction in response to a change in the posture of the optical disk device is detected.

If the slider is driven to position the objective lens to the center of the optical field of view based on the signal detected as the acceleration of gravity and the low-frequency component of the tracking servo signal, slider control is performed with reference to the tracking servo signal corrected to the level of gravity acting on the objective lens.

Even when the objective lens is displaced by its own weight, the optical disk device is free from the problem that the objective lens is displaced from the center of the optical field of view in the slider control.

DESCRIPTION OF THE PREFERRED EMBODIMENTS

Figure 1:
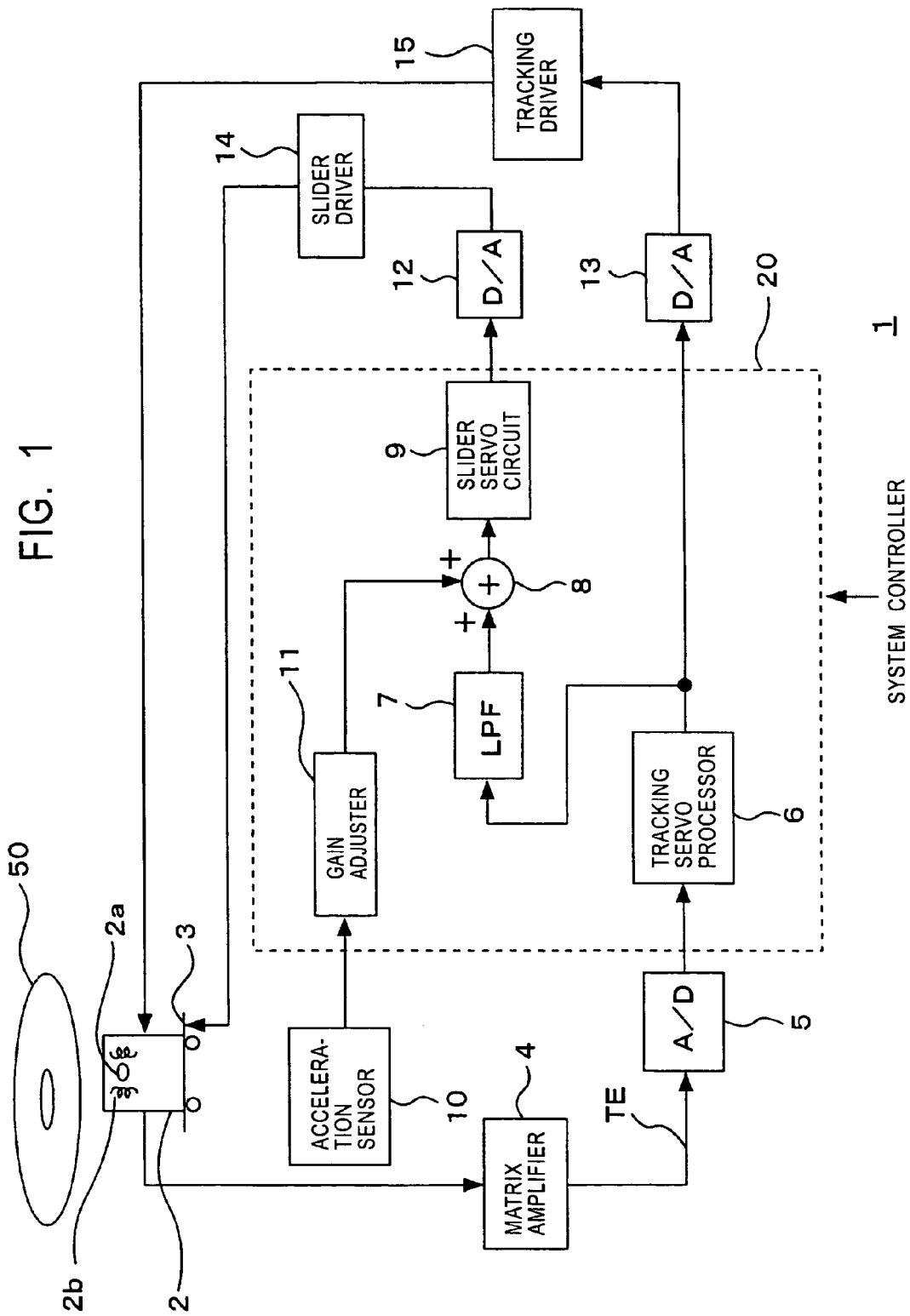
FIG. 1 is a block diagram of a major portion of the internal structure of an optical disk device in accordance with one preferred embodiment of the present invention.

FIG. 1 is a block diagram illustrating the internal structure of an optical disk device 1 in accordance with one preferred embodiment of the present invention.

FIG. 1 illustrates a major portion of the optical disk device 1, namely, only blocks related to a tracking servo system and a slider control system, and does not illustrate other circuit arrangements.

The optical disk device 1, implemented as a video camera, records, on an optical disk 50, video data captured by a camera block (not shown). The optical disk device 1 also replays the video data recorded on the optical disk 50.

Such a video camera is portable rather than being fixed, and may take any position depending on the operational conditions desired by a user.

The optical disk 50 shown in FIG. 1 is a high-density disk called a blue-ray disk.

The blue-ray disk performs recording and replay operations using a blue laser having a central emission frequency of 405 nm and an objective lens of numerical aperture (NA) of 0.85. A disk of 12 cm diameter records/replays data of 23.2 gigabytes under the parameters of a track pitch of 0.32 $\mu$m, a line density of 0.12 $\mu$m/bit, a 64 kilobyte data block as a record and replay unit, and a format efficiency of 82%.

The blue-ray disk records/replays data of 25 gigabytes if the line density is changed to 0.112 $\mu$m/bit with the remaining parameters unchanged. If a recording layer is multiplied, for example, to two layers, the recording capacity may be increased to 46.6 gigabytes or 50 gigabytes.

The blue-ray optical disk 50 mounted on a turntable (not shown) is rotated at a constant linear velocity (CLV) by a spindle motor (not shown) during recording/replay operations.

A pickup 2 reads data on the optical disk 50, i.e., data written in emboss pits on an ROM disk, or data in phase change marks on a rewritable disk.

In the case of the rewritable disk, address in pre-groove (ADIP) information and disk information embedded by wobbling of groove tracks are read from the disk.

During the recording operation to the rewritable disk, the pickup 2 records data in the groove track in phase change marks.

The pickup 2 contains a semiconductor laser as a laser light source. The pickup 2 further contains a photodetector for detecting laser light reflected from the disk, an objective lens 2a which serves as an output end of the laser light beam, and an optical system that directs the laser light beam to the recording surface of the disk through the objective lens 2a, and guides the reflected laser beam to the photodetector.

In the pickup 2, a two-axis actuator 2b movably supports the objective lens 2a in a direction of tracking and a direction of focusing.

The entire pickup 2 is transported by a slider 3 in a radial direction across the disk.

The photodetector detects the laser beam reflected from the optical disk 50 and converts the received laser beam into an electrical signal responsive to the received amount of laser beam, and feeds the electrical signal to a matrix amplifier 4.

The matrix amplifier 4 includes current-voltage converters functioning in response to output currents from a plurality of photoreceiving elements as photodetectors, and matrix processor/amplifier. The matrix amplifier 4 performs matrix processing on the inputs, thereby generating required signals.

For example, the matrix amplifier 4 generates a high-frequency signal (replay data signal) corresponding to replay data, a focus error signal for servo control, and a tracking error signal TE.

The matrix amplifier 4 outputs, as the tracking error signal TE, a pushpull signal if the optical disk 50 is a rewritable type, or a DPD signal if the optical disk 50 is a ROM type. Furthermore, the matrix amplifier 4 generates a signal relating to the wobbling of the groove, i.e., a pushpull signal for detecting the wobbling.

The above replay data generated by the matrix amplifier 4 is fed to a replay signal processor (not shown), where the replay data is subjected to replay signal processing. The replayed signal is thus output.

The focus error signal is fed to a focus servo circuit (not shown) in a digital signal processor (DSP) 20 to be used for a focus servo process.

The pushpull signal for detecting the wobbling is fed to an address detector (not shown) to detect an address.

The tracking error signal TE generated by the matrix amplifier 4 is converted into a digital signal by an analog-to-digital converter 5. The digital signal is then fed to a tracking servo processor 6 in the DSP 20.

Figure 2:
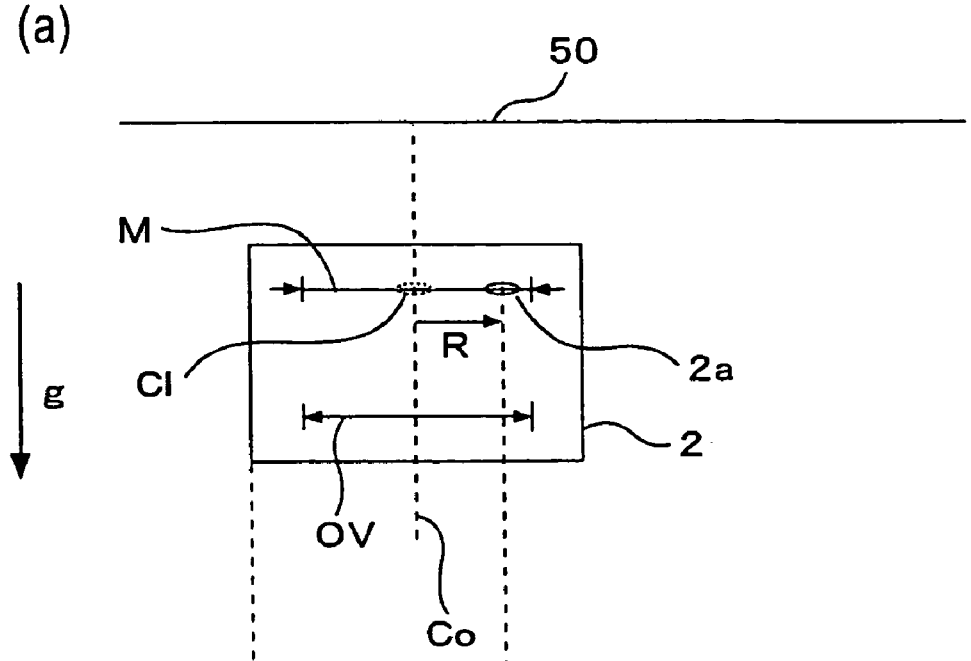
FIGS. 2A and 2B illustrate slider control performed by the optical disk device.
Figure 2:
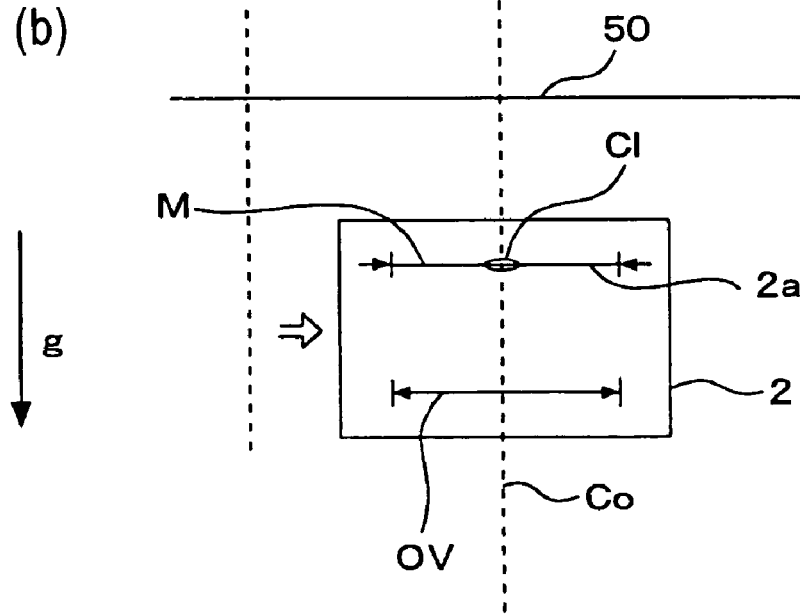

The matrix amplifier 4 is external to the pickup 2 as shown in FIG. 2. Alternatively, the matrix amplifier 4 may be housed in the pickup 2.

The tracking servo processor 6 performs a required process such as a phase compensation process on the tracking error signal TE. The tracking servo processor 6 then outputs the processed signal as a tracking servo signal to each of a low-pass filter 7, contained in the DSP 20, and a digital-to-analog converter 13.

The digital-to-analog converter 13 converts the tracking servo signal into an analog signal, which is then fed to a tracking driver 15. In response to a drive signal based on the tracking servo signal, the tracking driver 15 drives the two-axis actuator 2b in the pickup 2.

The objective lens 2a is thus controlled in position in response to the tracking servo signal, thereby following each track.

The low-pass filter 7 removes a high-frequency component from the tracking servo supplied from the tracking servo processor 6 while extracting a low-frequency component of the tracking servo signal. The low-frequency component of the tracking servo signal, serving as a reference signal for controlling the slider, is fed to a slider servo circuit 9 through an adder 8.

The slider servo circuit 9 generates a slider servo signal for driving the slider 3 so that the low-frequency component of the tracking servo signal as the reference signal becomes a zero level. The slider servo signal thus generated is output to a digital-to-analog converter 12.

The digital-to-analog converter 12 converts the slider servo signal into an analog signal, which is then fed to a slider driver 14. In response to a drive signal based on the slider servo signal, the slider driver 14 drives and controls the slider 3.

The basic slider control operation of the optical disk device 1 will now be discussed with reference to FIGS. 2A and 2B. FIGS. 2A and 2B diagrammatically illustrate the internal structure of the pickup 2. As shown, gravity acts in the direction represented by "g".

FIGS. 2A and 2B illustrate the optical disk 50, the pickup 2, and the objective lens 2a in the pickup 2 of FIG. 1.

In the pickup 2, the objective lens 2a is controlled in position to within a movable range M in a tracking direction by the two-axis actuator 2b (not shown) in the tracking servo operation thereof. As shown, a mechanical center position C1 of the objective lens 2a is centered on the approximate center position of the movable range M.

An optical field of view OV in the pickup 2 corresponds to the movable range M of the objective lens 2a. A center position Co of the optical field of view OV is approximately aligned with the mechanical center position C1 of the objective lens 2a.

Referring to FIG. 2A, the objective lens 2a, displaced from the mechanical center position C1 within the movable range M, is now controlled.

The two-axis actuator 2b is supplied with a drive signal to move the objective lens 2a from the mechanical center position C1. When the two-axis actuator 2b is supplied with the drive signal, the tracking driver 15 of FIG. 1 is supplied with a tracking servo signal responsive to the level of that drive signal.

For convenience of explanation, the level of the tracking servo signal is represented by the length of an arrow-headed line R. The length of the arrow-headed line R is a displacement from the mechanical center position C1 as shown.

The low-frequency component of the tracking servo signal, supplied to the tracking driver 15, is also supplied to the slider servo circuit 9. The slider servo circuit 9 generates the slider servo signal for driving the slider 3 so that the low-frequency component of the tracking servo signal becomes to a zero level. The slider driver 14 drives the slider 3 in response to the drive signal based on the slider servo signal.

Since the slider 3 is driven and controlled in response to the slider servo signal for shifting the low-frequency component of the tracking servo signal to a zero level. The pickup 2 is thus slid to move the objective lens 2a to the mechanical center position C1.

The pickup 2 is slid from the state shown in FIG. 2A to the state shown in FIG. 2B so that the low-frequency component of the tracking servo signal represented by the arrow-headed line becomes a zero level. The objective lens 2a is thus aligned with the center position Co of the optical field of view of the objective lens 2a.

As shown, the objective lens 2a is fixed to a position where track follow-up is performed in the tracking servo control. In other words, the pickup 2, namely, the optical field of view is slid to the position of the objective lens 2a in the tracking operation. The two centers are thus aligned with each other.

If the direction of gravity "g" is perpendicular to the tracking direction of the objective lens 2a as shown in FIG. 2, no gravity acts on the objective lens 2a in the tracking direction thereof.

As shown in FIG. 2B, the objective lens 2a is approximately aligned with the center position Co of the optical field of view by setting, as a target of the slider control, the position where the low-frequency component of the tracking servo signal becomes a zero level.

The optical disk device 1 of the present embodiment is assumed to be used in any posture. In other words, the optical disk device 1 is not limited to the posture shown in FIGS. 2A and 2B.

If the optical disk device 1 takes the posture thereof in a manner such that gravity acts on the objective lens 2a in the tracking direction, the slider control for center alignment of the optical field of view is not properly performed.

Figure 3:
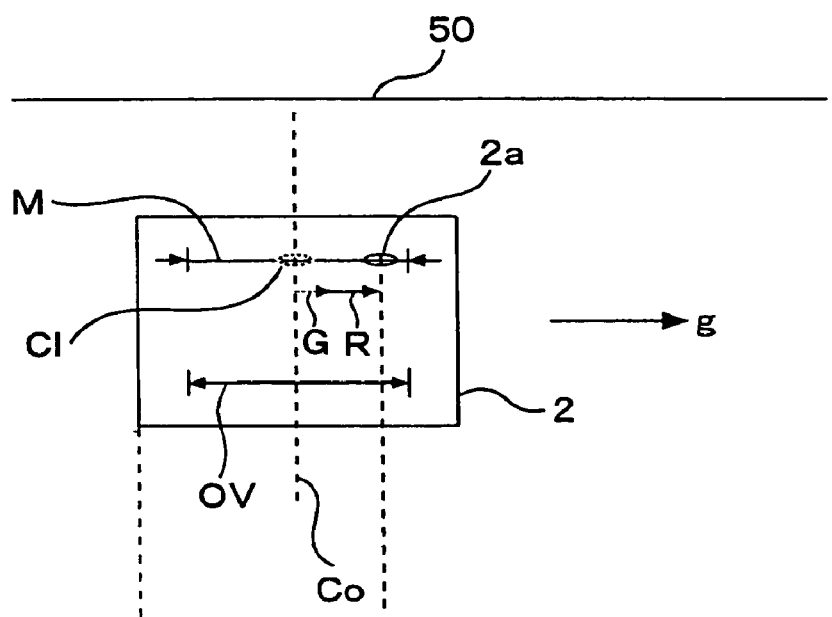
FIGS. 3A and 3B illustrate slider control performed by the optical disk device.
Figure 3:
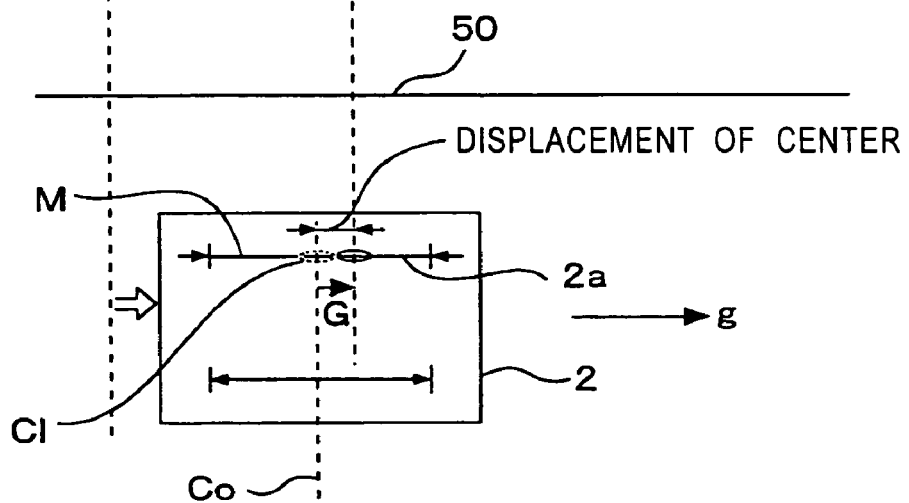

FIGS. 3A and 3B illustrate the slider control in which gravity acts on the objective lens 2a in the same direction as the tracking direction in response to a change in the posture of the optical disk device 1. Like FIGS. 2A and 2B, FIGS. 3A and 3B diagrammatically illustrate the internal structure of the pickup 2.

FIG. 3A illustrates the objective lens 2a which is shifted within the movable range M from the mechanical center position C1 to the position indicated in FIG. 2A.

In this case as well, the two-axis actuator 2b is supplied with the drive signal to move the objective lens 2a from the mechanical center position C1. In response, the tracking servo processor 6 outputs the tracking servo signal responsive to the level of the drive signal.

Since the direction of gravity "g" is aligned with the direction of movement of the objective lens 2a from the mechanical center position C1, the tracking servo signal is lower in level than the case of FIG. 2A.

A force of the acceleration of gravity moves the objective lens 2a in the direction of gravity "g" as represented by an arrow-headed broken line G. The length of an arrow-headed line R of the tracking servo signal is shorter than the counterpart in FIG. 2A.

The slider control already discussed, if performed, results in the state shown in FIG. 3B.

In the slider control, the pickup 2 is slid so that the low-frequency component of the tracking servo signal becomes a zero level. In this case, the pickup 2 is slid by the length corresponding to the length of the arrow-headed line R shown in FIG. 3A.

When the pickup 2 is slid by the length corresponding to the length of the arrow-headed line R shown in FIG. 3A, a difference results between the position of the objective lens 2a and each of the mechanical center position C1 of the objective lens 2a and the center position Co of the optical field of view as shown in FIG. 3B.

Since the gravity G originally acts on the objective lens 2a, the movement caused by the acceleration of gravity G is not detected if the slider control is performed based on only the low-frequency component of the tracking servo signal. As shown in FIG. 3B, the position of the objective lens 2a shifted in response to the acceleration of gravity G becomes the position where the low-frequency component of the tracking servo signal becomes the zero level (i.e., the slider control target). The difference results between the position of the objective lens 2a and each of the mechanical center position C1 of the objective lens 2a and the center position Co of the optical field of view.

In this preferred embodiment, the optical disk device 1 includes an acceleration sensor 10 and a gain adjuster 11, shown in FIG. 1, to perform the slider control taking into consideration gravity acting on the objective lens 2a in the tracking direction.

The acceleration sensor 10 detects at least the static acceleration. The detection of the static acceleration permits an inclination responsive to a change in the posture of the optical disk device 1 to be detected.

The acceleration sensor 10 detects the acceleration acting on the objective lens 2a at least in the tracking direction. The acceleration sensor 10 outputs a positive detected signal in response to the acceleration acting on the optical disk 50 in a radially outward direction in the tracking operation of the objective lens 2a. The acceleration sensor 10 outputs a negative detected signal in response to the acceleration acting on the optical disk 50 in a radially inward direction.

The optical disk 50 may be of a type that measures acceleration in a range up to 2 G or so.

The gain adjuster 11, arranged in the DSP 20, provides a predetermined gain to the signal detected by the acceleration sensor 10. The detected signal at an appropriate gain is thus fed to the adder 8.

In this arrangement, a signal component responsive to the signal output by the acceleration sensor 10 is added to the low-frequency component of the tracking servo signal to be supplied to the slider servo circuit 9.

Figure 4:
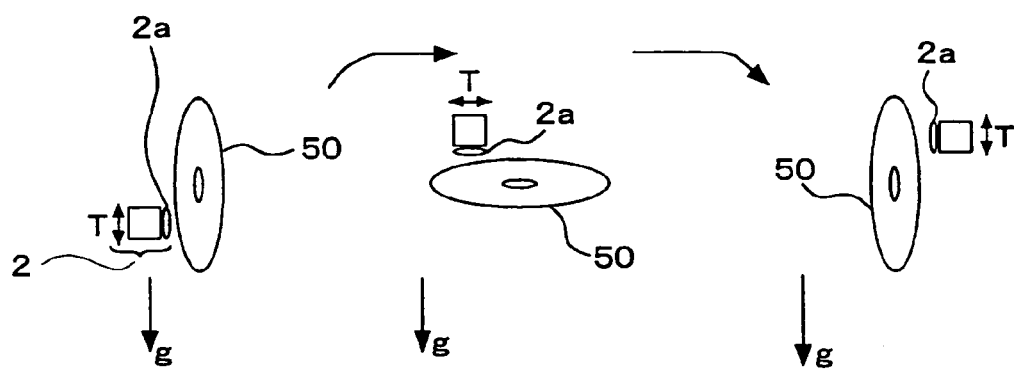
FIGS. 4A and 4B illustrate the operation of the optical disk device in accordance with one preferred embodiment of the present invention.
Figure 4:
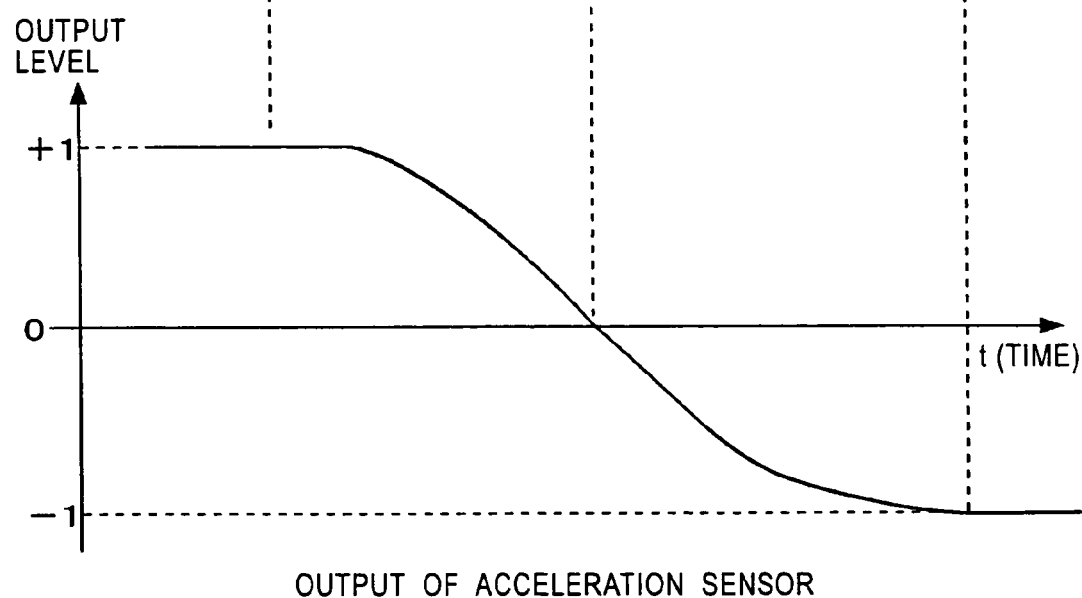

The operation of the optical disk device 1 thus constructed will now be discussed with reference to FIGS. 4A and 4B. FIG. 4A illustrates the state of the optical disk 50 and the pickup 2 (including the objective lens 2a) with respect to the direction of gravity with the posture of the optical disk device 1 changed.

FIG. 4B illustrates the output signal (detected signal) of the acceleration sensor 10 in response to the change in the posture of the optical disk device 1.

At time t1 shown in FIG. 4A, the acceleration sensor 10 outputs a detected signal corresponding to the acceleration of gravity (+)1 G as shown in FIG. 4B if a change in the posture of the optical disk device 1 causes the direction of gravity g to be aligned with the radially outward direction of the optical disk 50 along the tracking direction T of the objective lens 2a.

In this way, the acceleration sensor 10 outputs a positive detected signal in response to the acceleration acting in the radially outward direction of the optical disk 50 of the tracking operation of the objective lens 2a.

When the optical disk device 1 is tilted by 90 degrees in posture from the state at time t1, the tracking direction T of the objective lens 2a becomes perpendicular to the direction of gravity g as it approaches time t2. The gravity, which acted on the objective lens 2a in the radially outward direction of the optical disk 50 at time t1, acts on the objective lens 2a in the tracking direction at a decreased level.

At time t2, the direction of gravity "g" is perpendicular to the tracking direction T. The gravity acting in the tracking direction T becomes zero.

As the optical disk device 1 is shifted from the state at time t1 to the state at time t2, the detected signal output from the acceleration sensor 10 is reduced in level from the level corresponding to +1 G to the level corresponding to 0 G as shown in FIG. 4B.

When the optical disk device 1 is further tilted by 90 degrees from the state at time t2, the direction of gravity "g" is aligned with the radially inward direction of the optical disk 50 along the tracking direction T of the objective lens 2a at time t3.

From time t2 to time t3, gravity causing the objective lens 2a to move in the radially inward direction of the optical disk 50 gradually increases. At time t3, the acceleration sensor 10 outputs a detected signal corresponding to −1 G, namely, in a direction opposite from the direction at time t1.

As the optical disk device 1 is shifted from the sate at time t2 to the state at time t3, the detected signal output from the acceleration sensor 10 is reduced in level from the level corresponding to 0 G to the level corresponding to −1 G as shown in FIG. 4B.

The signal output from the acceleration sensor 10 in response to the change in the posture of the optical disk device 1 is shifted to an appropriate level by the gain adjuster 11, and is then fed to the adder 8. The slider servo circuit 9 is thus supplied with a signal that is obtained by adding the signal component corresponding to the detected signal to the low-frequency component of the tracking servo signal output from the low-pass filter 7.

More specifically, the slider servo circuit 9 performs a control operation so that the low-frequency component of the tracking servo signal containing the signal component corresponding to the detected signal drops to a zero level.

When the slider servo circuit 9 performs the control operation so that the low-frequency component of the tracking servo signal containing the signal component corresponding to the detected signal drops to a zero level, the pickup 2 is slid so that a sum of the arrow-headed line R and the arrow-headed line G shown in FIG. 3A is cancelled.

The control target is the sum of the arrow-headed line R of FIG. 3A representing the low-frequency component of the tracking servo signal and the arrow-headed line G representing the detected signal corresponding to the acceleration of gravity acting on the objective lens 2a. The pickup 2 is slid to cancel the sum of the arrow-headed line R and the arrow-headed line G.

When the pickup 2 is slid to cancel the sum of the arrow-headed line R and the arrow-headed line G, a portion corresponding to the arrow-headed line G shown in FIG. 3B is also cancelled. In this way, the mechanical center position C1 of the objective lens 2a is aligned with the center position Co of the optical field of view.

The slider control target is corrected in response to the acceleration of gravity acting on the objective lens 2a by adding the detected signal component to the low-frequency component of the tracking servo signal.

In response to a change in the posture of the optical disk device 1 as shown in FIG. 4A, the acceleration sensor 10 outputs the detected signal as shown in FIG. 4B. The detected signal thus corrects the slider control target to an appropriate value taking into consideration the change in the posture of the optical disk device 1.

Even when the optical disk device 1 is changed in posture, the slider control target is corrected in response to the acceleration of gravity G acting in the tracking direction T of the objective lens 2a.

The position of the objective lens 2a is controlled to be aligned with the center position Co of the optical field of view regardless of the posture of the optical disk device 1.

The optical disk device 1 thus provides for excellent optical characteristics during tracking operation by controlling the objective lens 2a in position to be in alignment with the center position Co of the optical field of view.

The tracking servo operation is stabilized by maintaining the excellent optical characteristics. Stable performance of the recording and replay operations is thus achieved.

One modification of the preferred embodiment will now be discussed.

In the modification, the detected signal of the acceleration sensor 10 is used to control the slide operation of the pickup 2 during a seek operation. Depending on the relationship between the direction of the movement of the pickup 2 and the direction of acceleration of gravity, seek time is subject to variations during the seek operation. Using the acceleration sensor 10, the DSP 20 varies the level of the drive signal output by the slider driver 14 in response to the acceleration of gravity acting in the slide direction. Regardless of the posture of the optical disk device 1, a reliable seek operation is performed.

In another modification of the preferred embodiment, a track jump pulse output from the tracking driver 15 is adjusted in response to the level of the detected signal from the acceleration sensor 10. The objective lens 2a may fail to move in response to the jump pulse depending on the relationship between the jump direction and the direction of gravity.

If the level of the track jump pulse is adjusted in response to the detected signal from the acceleration sensor 10 in the DSP 20, the track jump operation is reliably performed regardless of the posture of the optical disk device 1.

The optical disk of the optical disk device of the preferred embodiment of the present invention is a blue-ray optical disk, for example. The present invention is equally applicable to other optical disks such as compact disks, mini disks, digital versatile disks (DVDs), and magneto-optical disks.

In the discussion of the preferred embodiment of the present invention, the optical disk device 1 is implemented as a video camera. The present invention is not limited to the video camera. The present invention is applicable to any optical disk device such as a portable type disk player/recorder as long as the optical disk device is used in a variety of postures thereof.

In the above-referenced preferred embodiment, the acceleration sensor 10 is aligned so that the acceleration sensor 10 outputs the positive value in response to the acceleration acting on the objective lens 2a in the radially outward direction of the optical disk 50 while outputting the negative value in response to the acceleration acting on the objective lens 2a in the radially inward direction of the optical disk 50.

Alternatively, the alignment of the acceleration sensor 10 may be reversed.

In this arrangement, the polarity of the detected signal responsive to the change in the posture of the optical disk device 1 is reversed. Also, the detected signal must be subtracted from the tracking servo signal to correctly perform the slider control instead of being added to the tracking servo signal. Also, a subtracter is substituted for the adder 8 of FIG. 1.

What is claimed is:

1. An optical disk device for recording a signal to and/or replaying a signal from an optical disk, the optical disk device comprising:
   a head, including an actuator that supports and moves an objective lens at least in a direction of tracking, for writing the signal onto the optical disk and/or reading the signal from the optical disk by directing a laser beam to the optical disk through the objective lens;
   a slider configured to transport the head in the direction of tracking;
   an acceleration sensor configured to detect and output a static acceleration acting on the objective lens in response to a change in posture of the optical disk device; and
   a slider controller configured to drive the slider so that the objective lens is aligned with the center of an optical field of view of the head, based on a detection signal from the acceleration sensor and a low-frequency component of a tracking servo signal for causing the objective lens to track, the slider controller including,
   a gain adjusting circuit that provides a predetermined gain to the signal from the acceleration sensor so that a signal corresponding to the detection signal output from the acceleration sensor is added to the low-frequency component of the tracking servo signal.

2. An optical disk device according to claim 1, wherein the acceleration sensor outputs a positive signal in response to an acceleration acting in one of a radially inward direction and a radially outward direction across the optical disk in the tracking operation of the objective lens, while outputting a negative signal in response to an acceleration acting in the other of the radially inward direction and the radially outwardly direction across the optical disk.

3. An optical disk device according to claim 1, wherein the acceleration sensor detects the acceleration of gravity taking place in the direction of movement of the head in a seek operation thereof, and wherein the slider controller varies the level of a drive signal for driving the slider in response to the acceleration of gravity.

4. An optical disk device according to claim 1, wherein a track jump pulse is varied in response to the level of the detection signal from the acceleration sensor during a track jump operation of the objective lens.

5. A slider control method for controlling an optical disk device for recording a signal to and/or replaying a signal from an optical disk, the optical disk device including a head including an actuator that supports and moves an objective lens at least in a direction of tracking, for writing the signal onto the optical disk and/or reading the signal from the optical disk by directing a laser beam to the optical disk through the objective lens, and a slider for transporting the head in the direction of tracking, the control method comprising the steps of:
   detecting a static acceleration acting on the objective lens in response to a change in posture of the optical disk device;
   driving the slider so that the objective lens is aligned with the center of an optical field of view of the head, based on the detected signal and a low-frequency component of a tracking servo signal for causing the objective lens to track; and
   providing a predetermined gain to the detected acceleration to generate a first signal, and adding the first signal corresponding to the detected acceleration to the low-frequency component of the tracking servo signal.

* * * * *